Sept. 12, 1944.  J. W. CAMPBELL  2,357,998
MOLD FOR SPLICED CABLE JOINTS
Filed May 10, 1943
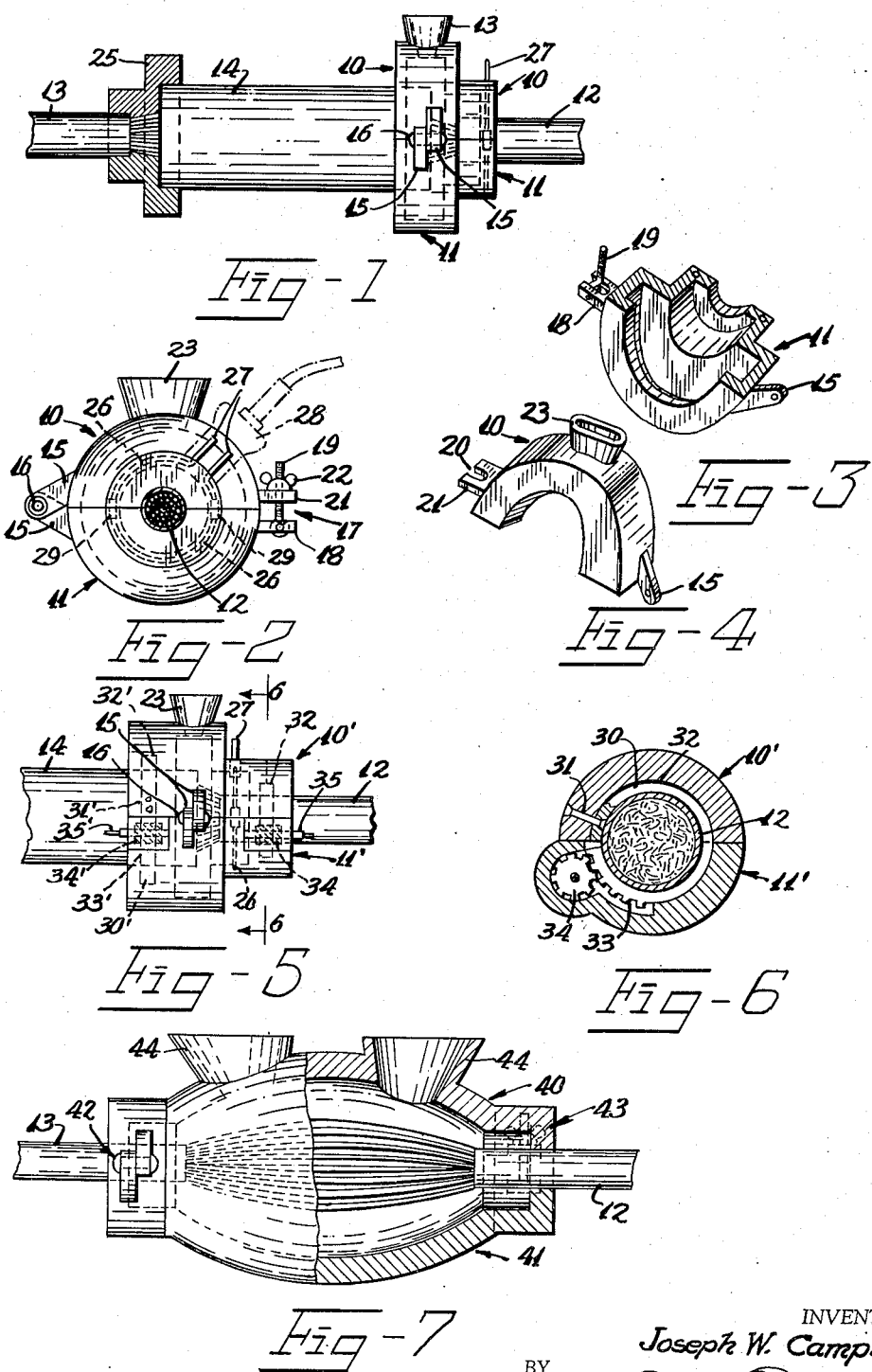
INVENTOR.
Joseph W. Campbell
BY
Zoltan Holcheck
ATTORNEY Patented Sept. 12, 1944

2,357,998

UNITED STATES PATENT OFFICE 2,357,998

MOLD FOR SPLICED CABLE JOINTS

Joseph W. Campbell, Paterson, N. J.

Application May 10, 1943, Serial No. 486,414

4 Claims. (Cl. 18—36)

This invention relates to new and useful improvements in a mold for spliced cable joints.

Heretofore, it has been customary to engage a lead sleeve or other type of sleeve over the adjacent ends of a spliced cable. This construction by itself proved insufficient in that the ends of the lead sleeve were open. Good mechanics would attempt to caulk or solder the ends closed. This invention contemplates the provision of a mold which may be readily engaged over the ends of the lead sleeve and by which a solid piece of metal or substance may be cast around the lead sleeve for sealing its ends.

More particularly, the invention proposes to characterize the mold by the fact that it is provided with heating means for keeping the sealing substance sufficiently fluid while it flows into position.

The invention further contemplates using the mold, or modified forms of the mold for casting or molding insulation material around the spliced ends of cables.

Still further the invention proposes to thermostatically control the heat of the heating means of the mold.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of the ends of spliced cables constructed in accordance with this invention and illustrating the mold in position.

Fig. 2 is an end elevational view of Fig. 1.

Fig. 3 is a perspective view of one of the mold sections.

Fig. 4 is a perspective view of another one of the mold sections.

Fig. 5 is a fragmentary elevational view of another spliced joint with a mold constructed in accordance with a modified form of this invention.

Fig. 6 is a sectional view taken on the line 6—6 of Fig. 5.

Fig. 7 is a fragmentary elevational view of a spliced joint with another form of mold thereon, a portion thereof being broken away to disclose interior parts.

In the form of the invention disclosed in Figs. 1 to 4, the mold for spliced cable joints includes a pair of opposed semi-cylindrical hollow bodies 10 and 11 for encompassing a joint of the cables 12 and 13. More particularly, the cables 12 and 13 are spliced together and the spliced connection is covered with the usual lead sleeve 14. The opposed bodies 10 and 11 are disposed over the joint of one end of the sleeve 14 and the adjacent cable.

There is a means for holding the bodies 10 and 11 in position on the cable. This means includes lugs 15 projecting from the bodies and pivotally connected together by a pintle 16. This construction pivotally connects the bodies 10 and 11 at one side. At the other side there is a latch device 17. This latch device includes a lug 18 upon one of the bodies, a screw 19 pivotally mounted on the lug 18 and engaging through an opening 20 in another lug 21 formed on the other of the bodies. A wing nut 22 threadedly engages the screw 19 for clamping the lugs 18 and 21 together and thus indirectly clamping the bodies 10 and 11 together.

One of the bodies, specifically the top body 10, is provided with a mouth opening 23 through which melted sealing substance may be poured into the bodies. Each of the bodies has an interior hollow which controls the formation of the casting on the joint. In Fig. 1, at the left, the part indicated by reference numeral 25, comprises a sectional detail of the casting. It should be noted that this casting 25 seals the adjacent ends of the cable 13 and the lead sleeve 14.

Heater means is also provided for the bodies 10 and 11 for keeping the said sealing substance sufficiently fluid while it flows into position. This heating means includes heater windings 26 within the bodies 10 and 11 and connected with terminals 27 for an electric socket 28 from some source of power. The heater windings 26 have the usual connectors 29 at the points where the bodies 10 and 11 separate so that there is a complete circuit through all portions of the windings within the bodies 10 and 11.

The operation of the device is as follows:

The mold is mounted upon the adjacent ends of the cable and the lead sleeve. Then the heaters 26 are operated to heat the mold to a sufficient heat. The melted sealing substance is then poured into the mouth 23 and it will flow around and fill the interior of the bodies 10 and 11 covering the adjacent ends of the lead sleeve 14 and the cable. When this sealing substance has become sufficiently cool that it maintains its shape, the latch 17 is opened and the mold bodies 10 and 11 are removed. The operation is then repeated to cast a similar sealing casting at the other end of the sleeve 14 and over the adjacent cable.

In Figs. 5 and 6 a modified form of the invention has been disclosed which distinguishes from the prior form in the fact that the mold includes a pair of opposed semi-annular hollow bodies 10' and 11' for encompassing a joint of the cable. These bodies distinguish from the prior bodies in that they are wider. Moreover, a means is associated with each of the ends of these bodies for gripping the cable and the lead sleeve for preventing excessive leaking of the sealing material. More specifically, an annularly shaped strip 30 of flexible metal material is permanently attached at one end by a rivet 31 to one of the body sections of the mold. It extends around in a groove 32 in the bodies of the mold so as to encircle the adjacent end of the cable. The free end of this strip 31 is provided with a portion 33 having rack teeth meshing with a worm 34 rotatively supported in the body and provided with a projecting shaft 35 for receiving a turning tool. The arrangement is such that the turning tool may be engaged on the shaft 35 and operated to contract the strip 30 which will tightly grip the cable 12. The bodies 10' and 11' have a similar strip 30' disposed in a groove 32' at its other end. This strip 30' has one end permanently held by a rivet 31'. Its other end is provided with rack teeth 33' meshing with a worm pinion 34' rotatively supported by a shaft 35' adapted to receive a turning tool. Thus the shaft 35' may be operated to cause the strip 30' to tightly grip the lead sleeve 14.

In other respects this form of the invention is identical to the previous form and identical parts have been given identical reference numerals.

The operation of this form of the device is substantially identical to the prior form except for the fact that before the melted sealing substance is poured into the mouth 23, the strips 30 and 30' are tightened to prevent excessive leakage of the sealing substance, so that it is maintained as desired within the hollow of the said hollow bodies 10' and 11'.

In Fig. 7 still another modified form of the invention is disclosed in which there is a mold formed of a pair of opposed semi-annular hollow bodies 40 and 41 adapted to encompass the adjacent ends of spliced cables so as to cover the spliced ends. The bodies 40 and 41 are pivotally connected at each of their sides at one of their sides by hinge constructions 42. The other sides are equipped with clamp means 43 at each of their ends. One of the bodies is provided with mouth openings 44 through which melted sealing substance may be poured. This mold is shown engaged upon the ends of the cables 12 and 13.

In this form of the invention a lead sleeve is not required. Sealing substance of an insulation nature, such as rubber, is cast about the spliced ends of the cables for sealing the same.

It is to be understood that the heating units may also be in the form of electric plugs, secured to the mold in any suitable manner.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A mold for spliced cable joints, comprising a pair of opposed semi-annular hollow bodies for encompassing a joint of cable, means for holding said bodies upon said joint of cable, one of said bodies having a mouth opening for the melted sealing substance, heater means on said bodies for keeping said sealing substance sufficiently fluid while it flows into position, and means for encircling and gripping said cable at the ends of said bodies for preventing excessive leaking out of said sealing substance, comprising strips mounted upon the ends of said bodies within grooves in the bodies and being permanently attached to one of the bodies and extending around the hollows of the bodies, and means for contracting said strips, comprising ratchet teeth on the strips and worms meshing with said teeth and provided with turnable shafts.

2. A mold for spliced cable joints, comprising a pair of opposed semi-annular hollow bodies for encompassing a joint of cable, means holding said bodies upon said joint of cable, one of said bodies having a mouth opening for the melted sealing substance, circular strips mounted within grooves formed in the ends of said bodies, means permanently attaching one of the ends of said strips to one of said bodies while the free ends project around the hollows of the bodies, rack teeth formed on the free ends of said strips, and worms mounted in the other of said bodies and meshing with said rack teeth to draw said strips tightly about the ends of said cable joint to prevent the excessive leaking out of seal substance.

3. A mold for spliced cable joints, comprising a pair of opposed semi-annular hollow bodies for encompassing a joint of cable. means holding said bodies upon said joint of cable, one of said bodies having a mouth opening for the melted sealing substance, circular strips mounted within grooves formed in the ends of said bodies, means permanently attaching one of the ends of said strips to one of said bodies while the free ends project around the hollows of the bodies, rack teeth formed on the free ends of said strips, and worms mounted in the other of said bodies and meshing with said rack teeth to draw said strips tightly about the ends of said cable joint to prevent the excessive leaking out of seal substance, said means, comprising a rivet engaged through the end of said strip and said body.

4. A mold for spliced cable joints, comprising a pair of opposed semi-annular hollow bodies for encompassing a joint of cable, means holding said bodies upon said joint of cable, one of said bodies having a mouth opening for the melted sealing substance, circular strips mounted within grooves formed in the ends of said bodies, means permanently attaching one of the ends of said strips to one of said bodies while the free ends project around the hollows of the bodies, rack teeth formed on the free ends of said strips, and worms mounted in the other of said bodies and meshing with said rack teeth to draw said strips tightly about the ends of said cable joint to prevent the excessive leaking out of a seal substance, said worms being fixedly mounted upon rotative shafts having ends extended from said body to be engaged by a turning tool for turning said worms.

JOSEPH W. CAMPBELL.